United States Patent
Jimbo et al.

(10) Patent No.: US 11,947,492 B2
(45) Date of Patent: Apr. 2, 2024

(54) INFORMATION PROCESSING DEVICE, TERMINAL DEVICE, AND SEARCH METHOD

(71) Applicant: SONY GROUP CORPORATION, Tokyo (JP)

(72) Inventors: Masanobu Jimbo, Tokyo (JP); Shinya Maruyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 25 days.

(21) Appl. No.: 17/755,662

(22) PCT Filed: Sep. 30, 2020

(86) PCT No.: PCT/JP2020/037066
§ 371 (c)(1),
(2) Date: May 4, 2022

(87) PCT Pub. No.: WO2021/095384
PCT Pub. Date: May 20, 2021

(65) Prior Publication Data
US 2022/0391351 A1    Dec. 8, 2022

(30) Foreign Application Priority Data
Nov. 14, 2019   (JP) .................. 2019-206523

(51) Int. Cl.
*G06F 16/14*       (2019.01)
*G06F 16/38*       (2019.01)
*H04L 9/08*        (2006.01)

(52) U.S. Cl.
CPC .......... *G06F 16/148* (2019.01); *G06F 16/381* (2019.01); *H04L 9/0822* (2013.01)

(58) Field of Classification Search
CPC ..... G06F 16/148; G06F 16/381; H04L 9/0822
See application file for complete search history.

(56) References Cited

U.S. PATENT DOCUMENTS

| | | | |
|---|---|---|---|
| 8,533,489 B2* | 9/2013 | Roeder | H04L 9/00 380/278 |
| 9,715,546 B1* | 7/2017 | Mohassel | G06F 16/951 |
| 2009/0300351 A1* | 12/2009 | Lei | G06F 16/986 707/999.005 |

FOREIGN PATENT DOCUMENTS

JP       2018-029268 A     2/2018

OTHER PUBLICATIONS

International Search Report and Written Opinion of PCT Application No. PCT/JP2020/037066, dated Dec. J2, 2020, 09 pages of ISRWO. (Year: 2020).*

(Continued)

*Primary Examiner* — Kuen S Lu
(74) *Attorney, Agent, or Firm* — CHIP LAW GROUP

(57) ABSTRACT

An information processing device (100) has: an acquisition unit (131) which acquires, from a second terminal device (50) of a second user, an encryption search index, which is a search keyword encrypted by searchable encryption using a shared key and a verification key acquired from a first terminal device (10) of a first user who owns a document, and an identifier of the second user who searches for the document; a test unit (132) which checks a database, in which the encrypted-document index of an encrypted keyword of the document generated in the first terminal device (10), an encrypted document associated with the encrypted-document index, and a test key and a re-encryption key corresponding to the second user are registered, and tests the encryption search index by using the test key based on the identifier of the second user; and a generation unit (133, 134) which encrypts the encrypted document, which has been searched for by using the tested encryption search index, by the re-encryption key based on the identifier of the second user to generate a search result.

9 Claims, 10 Drawing Sheets

(56) References Cited

OTHER PUBLICATIONS

Patel, et al., "Symmetric Searchable Encryption with Sharing and Unsharing", Springer International Publishing, Oct. 3, 2017, 27 pages. (Year: 2017).*

Hisao Sakazaki, "Proposal for Common Key Searchable Encryption Capable of Many-to-Many Encryption", Proceedings of the 2019 Symposium on Cryptography and Information Security, Jan. 15, 2019, 07 pages.

Hisao Sakazaki, "Proposal for Hidden Attribute Authentication Using Searchable Encryption", Proceedings of the 2016 Symposium on Cryptography and Information Security, Jan. 19, 2016, 08 pages.

Patel, et al., "Symmetric Searchable Encryption with Sharing and Unsharing", Springer International Publishing, Oct. 3, 2017, 27 pages.

International Search Report and Written Opinion of PCT Application No. PCT/JP2020/037066, dated Dec. 22, 2020, 09 pages of ISRWO.

* cited by examiner

FIG.5

| INDEX | DOCUMENT 1 | DOCUMENT 2 | ... |
|---|---|---|---|
| a | D | - | ... |
| b | D | E | ... |
| c | D | F | ... |
| ... | ... | ... | ... |

INFORMATION PROCESSING DEVICE, TERMINAL DEVICE, AND SEARCH METHOD

CROSS REFERENCE TO RELATED APPLICATIONS

This application is a U.S. National Phase of International Patent Application No. PCT/JP2020/037066 filed on Sep. 30, 2020, which claims priority benefit of Japanese Patent Application No. JP 2019-206523 filed in the Japan Patent Office on Nov. 14, 2019. Each of the above-referenced applications is hereby incorporated herein by reference in its entirety.

FIELD

The present disclosure relates to an information processing device, a terminal device, and a search method.

BACKGROUND

When a document is saved in a service which provides a storage on a network, encryption is carried out so that the contents of the document are not found out by an operator providing this service. If searching is to be carried out with respect to documents saved in this service, the documents are encrypted by using searchable encryption which enables searching in an encrypted state. Also, searchable encryption which manages, in a document unit, users who can access documents in a case in which the encrypted documents are shared is known.

CITATION LIST

Non Patent Literature

Non Patent Literature 1: Sarvar Patel and two others, "Symmetric Searchable Encryption with Sharing and Unsharing", [Online], Oct. 3, 2017, ESORICS 2018, [Oct. 23, 2019], the Internet <https://eprint.iacr.org/2017/973.pdf>

SUMMARY

Technical Problem

However, since the above described conventional technique uses computation on groups for searchable encryption, calculation cost becomes high. Therefore, it is difficult to speed-up keyword searching with respect to the encrypted documents.

Therefore, the present disclosure proposes an information processing device, a terminal device, and a search method capable of carrying out keyword searching of encrypted documents at high speed.

Solution to Problem

According to the present disclosure, an information processing device comprises an acquisition unit that acquires, from a second terminal device of a second user, an encryption search index and an identifier of the second user who searches for a document, the encryption search index of a search keyword being encrypted by searchable encryption using a shared key and a verification key acquired from a first terminal device of a first user who owns the document; a test unit that acquires the encrypted-document index generated in the first terminal device and including the keyword included in the document and encrypted by the searchable encryption, acquires an encrypted document of the document encrypted and associated with the encrypted-document index, acquires a test key corresponding to the second user based on the acquired identifier of the second user from a database registering the test key and a re-encryption key corresponding to the second user, and tests the encryption search index by using the test key; and a generation unit that acquires the re-encryption key corresponding to the second user from the database based on the acquired identifier of the second user, searches for the encrypted document from the database by using the tested encryption search index, and encrypts the searched encrypted document by the re-encryption key to generate a search result.

BRIEF DESCRIPTION OF DRAWINGS

FIG. 5 is a diagram illustrating an example of an encrypted-document-index storage unit.

DESCRIPTION OF EMBODIMENTS

Hereinafter, embodiments of the present disclosure will be described in detail based on drawings. In following embodiments, the same parts are denoted by the same reference signs to omit redundant descriptions.

The present disclosure is described in accordance with the order of items shown below.

1. Embodiment
    1-1. Configuration of System according to Embodiment
    1-2. Configuration of Terminal Device of Document Owner User according to Embodiment
    1-3. Configuration of Terminal Device of Document Searching User according to Embodiment
    1-4. Configuration of Server according to Embodiment
    1-5. Registration and Search by Document Owner User
    1-6. Search by Document Searching User
    1-7. Procedure of Information Processing according to Embodiment
2. Modification Example of Embodiment
3. Hardware Configuration
4. Effects (1. Embodiment)

[1-1. Configuration of System According to Embodiment]

Figure 1:
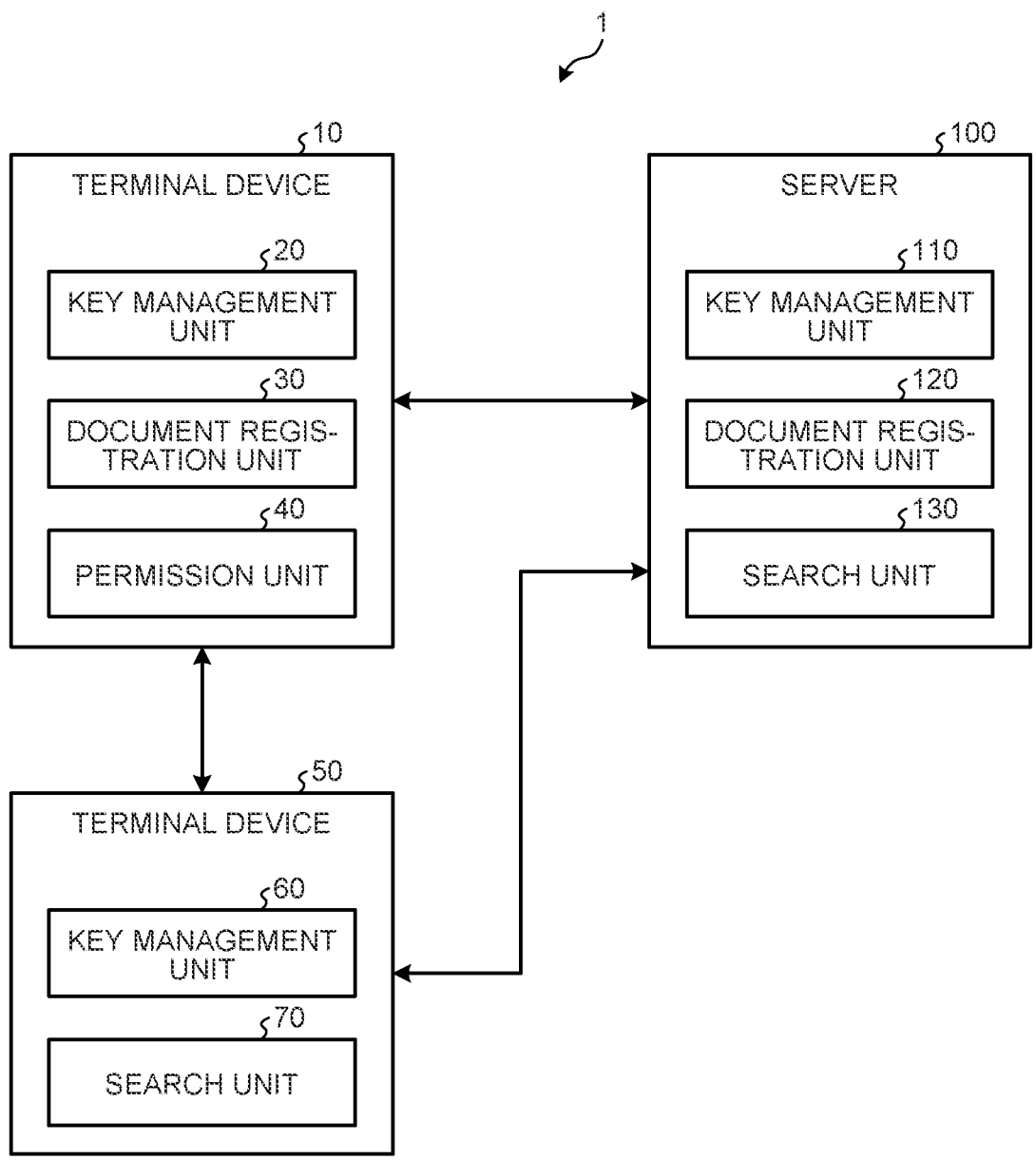
FIG. 1 is a diagram illustrating an example of a configuration of a search system according to an embodiment of the present disclosure.

FIG. 1 is a diagram illustrating an example of a configuration of a search system according to an embodiment of the present disclosure. As illustrated in FIG. 1, a search system 1 has a terminal device 10, a terminal device 50, and a server 100. The terminal device 10, the terminal device 50, and the server 100 are connected, for example, by an unillustrated network.

The terminal device 10 is an information processing device possessed by a document owner user, transmits encrypted documents to the server 100, and causes the server to save the documents. The server 100 is an information processing device, which provides storage via a network, and stores the encrypted documents, which have been received from the terminal device 10, in a searchable state. The terminal device 50 is an information processing device possessed by a document searching user and acquires and decrypts the encrypted documents, which are stored in the server 100, by using keys acquired from the terminal device 10. The terminal device 10 has a key management unit 20, a document registration unit 30, and a permission unit 40. The terminal device 50 has a key management unit 60 and a search unit 70. The server 100 has a key management unit 110, a document registration unit 120, and a search unit 130. Note that details of each device will be described later.

[1-2. Configuration of Terminal Device of Document Owner User According to Embodiment]

Figure 2:
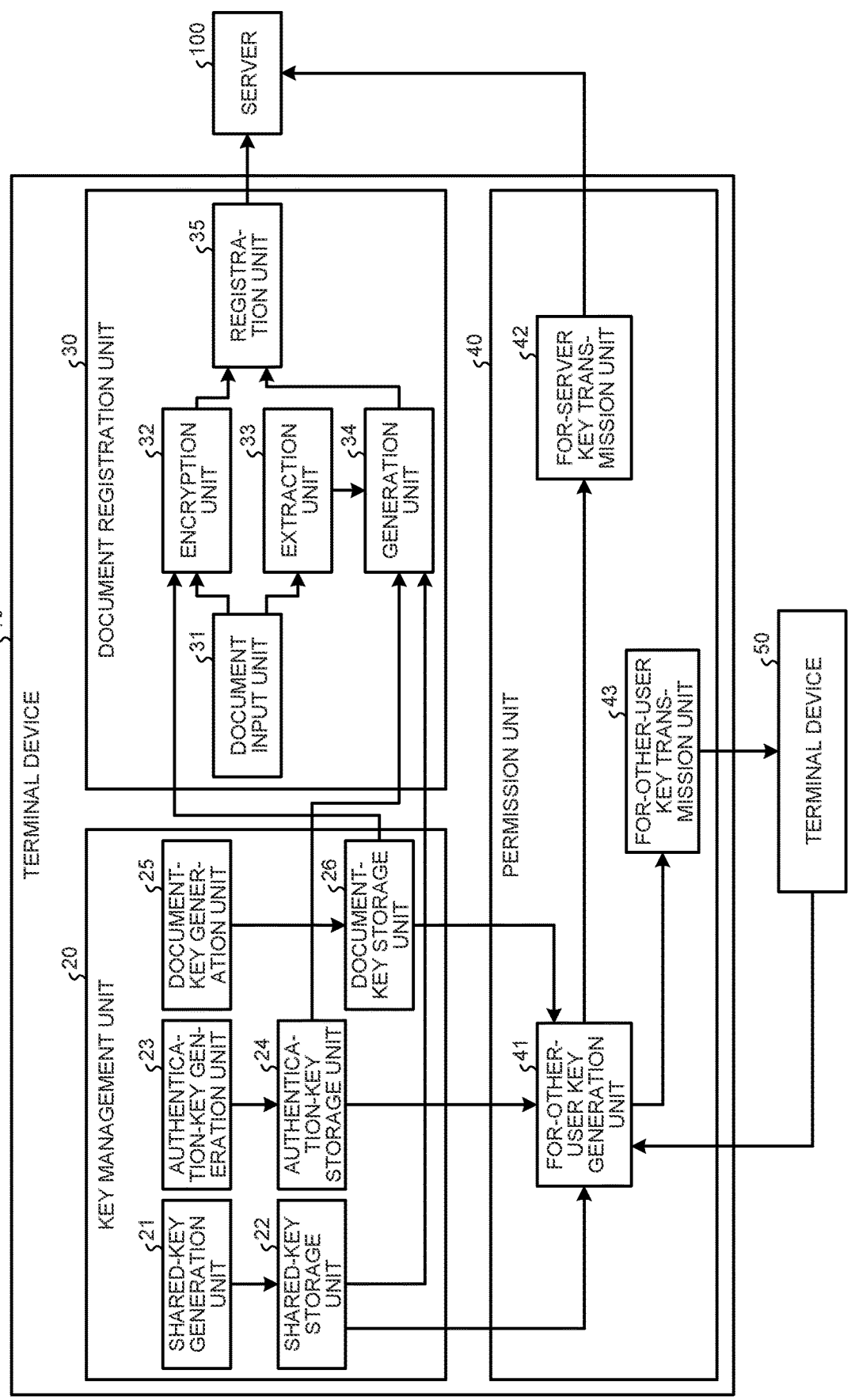
FIG. 2 is a diagram illustrating an example of a configuration of the terminal device of a document owner user according to the embodiment of the present disclosure.

FIG. 2 is a diagram illustrating an example of a configuration of the terminal device of the document owner user according to the embodiment of the present disclosure. As illustrated in FIG. 2, the terminal device 10 has the key management unit 20, the document registration unit 30, and the permission unit 40.

The key management unit 20 generates shared keys and authentication keys for generating encrypted indices about keywords in documents, generates document keys which encrypt or decrypt documents, and stores the generated keys. The key management unit 20 has a shared-key generation unit 21, a shared-key storage unit 22, an authentication-key generation unit 23, an authentication-key storage unit 24, a document-key generation unit 25, and a document-key storage unit 26.

The shared-key generation unit 21 generates a random number sequence having a predetermined length (number of bits) as a shared key K. The shared-key generation unit 21 stores the generated shared key K in the shared-key storage unit 22.

The authentication-key generation unit 23 generates a random number sequence having a predetermined length (number of bits) as an authentication key K'. The authentication-key generation unit 23 stores the generated authentication key K' in the authentication-key storage unit 24.

The document-key generation unit 25 generates document encryption keys KE of an encryption method which enables proxy re-encryption and master decryption keys KD as document keys based on random number sequences having a predetermined length (number of bits). Note that the encryption method which enables proxy re-encryption can be realized, for example, by pairing calculations. Also, the keys of the encryption method which enables proxy re-encryption may be public keys or shared keys. The document-key generation unit 25 stores the generated document encryption keys KE and the master decryption keys KD in the document-key storage unit 26.

The document registration unit 30 encrypts documents, which have been input by the document owner user, generates an encrypted index about keywords in the documents, and registers the index in the server 100. The document registration unit 30 has a document input unit 31, an encryption unit 32, an extraction unit 33, a generation unit 34, and a registration unit 35.

The document input unit 31 receives input of documents D from the document owner user who is the user of the terminal device 10. The document input unit 31 receives input of, for example, document files generated by the terminal device 10 and document files generated by other information processing devices. Also, examples of the documents D include testaments, contract documents of insurance, home purchase, etc., and highly sensitive documents. The document input unit 31 outputs the received documents D to the encryption unit 32 and the extraction unit 33.

When the document D is input from the document input unit 31, the encryption unit 32 acquires a document encryption key KE from the document-key storage unit 26. The encryption unit 32 encrypts the document D by the encryption method, which enables proxy re-encryption, by using the document encryption key KE to generate an encrypted document $Data_D$. In other words, the encrypted document $Data_D$ can be expressed as $Data_D$=Enc(D). The encryption unit 32 outputs the generated encrypted document $Data_D$ to the registration unit 35.

When the document D is input from the document input unit 31, the extraction unit 33 extracts a keyword group W(D) from the document D, for example, by using morphological analysis or the like. Note that the extraction unit 33 may configure the number of keywords, which are included in the keyword group W(D) extracted by setting conditions upon extraction, to be an arbitrary number. The extraction unit 33 outputs the extracted keyword group W(D) to the generation unit 34. Note that, in the below description, each of keywords included in the keyword group W(D) is expressed as a keyword $w_i$. In other words, the relation between the keyword group W(D) and the keyword $w_i$ is $w_i \in W(D)$.

When the keyword group W(D) is input from the extraction unit 33, the generation unit 34 acquires the shared key K and the authentication key K' from the shared-key storage unit 22 and the authentication-key storage unit 24. The generation unit 34 carries out computation shown in following Equation (1) for each keyword $w_i$ by using the shared key K and the authentication key K' and generates an encrypted-document index $Ind_i$.

$$Ind_i = H_K(w_i) \oplus K' \quad (1)$$

In other words, the generation unit 34 generates the encrypted-document index $Ind_i$ of the keyword $w_i$ by calculating an exclusive OR of a Keyed hash function of the keyword $w_i$ and the authentication key K'. When an encrypted-document index Ind(D) of the keyword group W(D) is generated, the generation unit 34 outputs the encrypted-document index Ind(D) to the registration unit 35.

To the registration unit 35, the encrypted document $Data_D$ is input from the encryption unit 32, and the encrypted-document index Ind(D) is input from the generation unit 34. The registration unit 35 associates an identifier of the document owner user (user Identifier (ID)) with the input encrypted document $Data_D$ and the encrypted-document index Ind(D) and transmits them to the server 100.

The permission unit 40 gives permission in a case in which a document searching user who is another user searches for the document D registered in the server 100. The permission unit 40 has for-other-user key generation unit 41, a for-server key transmission unit 42, and a for-other-user key transmission unit 43.

When a search permission request from the terminal device 50, which is possessed by the document searching user, is received, the for-other-user key generation unit 41 determines whether to give a search permission or not based on an identifier (user ID) of the document searching user contained in the document permission request. If it is determined not to give the search permission, the for-other-user key generation unit 41 transmits an error to the terminal device 50. If it is determined to give the search permission, the for-other-user key generation unit 41 acquires the shared key K from the shared-key storage unit 22, acquires the authentication key K' from the authentication-key storage unit 24, and acquires the master decryption key KD from the document-key storage unit 26.

The for-other-user key generation unit 41 divides the acquired authentication key K' into a verification key Ku' and a test key Ku". The dividing of the authentication key K' is carried out so as to satisfy following Equation (2). Also, the for-other-user key generation unit 41 divides the acquired master decryption key KD into a decryption key KDu for the document searching user and a re-encryption key KDu' to be used in re-encryption in the server 100.

$$K'_u \oplus K''_u = K' \quad (2)$$

The for-other-user key generation unit 41 outputs the user ID of the document searching user, the test key Ku", and the re-encryption key KDu' to the for-server key transmission unit 42. Also, the for-other-user key generation unit 41 outputs the shared key K, the verification key Ku', and the decryption key KDu to the for-other-user key transmission unit 43. Note that the for-other-user key generation unit 41 may set an expiration period for the shared key K, the verification key Ku', the test key Ku", the decryption key KDu, and the re-encryption key KDu' or may dispose of the keys so that a permission is obtained every time.

The for-server key transmission unit 42 associates the user ID of the document searching user, which has been input from the for-other-user key generation unit 41, with the test key Ku" and the re-encryption key KDu' and transmits them to the server 100.

The for-other-user key transmission unit 43 transmits the shared key K, the verification key Ku', and the decryption key KDu, which have been input from the for-other-user key generation unit 41, to the terminal device 50. Note that, as a method of sharing the keys with the terminal device 50, the for-other-user key transmission unit 43 can apply a sharing method using direct communication between terminal devices such as Bluetooth (registered trademark), Wi-Fi Direct (registered trademark), or QR code (registered trademark) or a sharing method by end-to-end encryption between the terminal devices via a network such as cloud.

[1-3. Configuration of Terminal Device of Document Searching User According to Embodiment]

Figure 3:
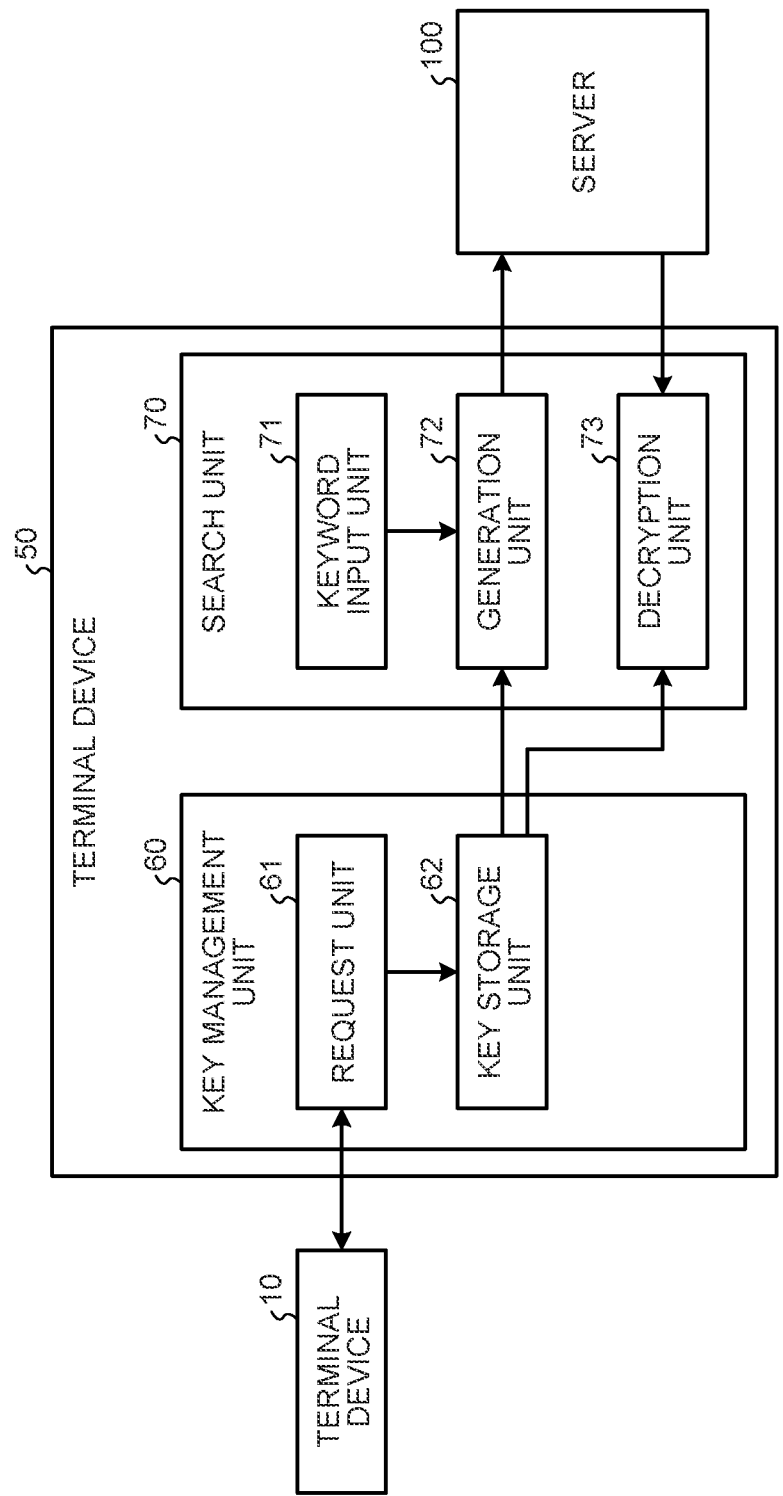
FIG. 3 is a diagram illustrating an example of a configuration of a terminal device of a document searching user according to the embodiment of the present disclosure.

FIG. 3 is a diagram illustrating an example of a configuration of the terminal device of the document searching user according to the embodiment of the present disclosure. As illustrated in FIG. 3, the terminal device 50 has a key management unit 60 and a search unit 70.

The key management unit 60 requests a search permission of the document D to the terminal device 10 of the document owner user and manages acquired keys. The key management unit 60 has a request unit 61 and a key storage unit 62.

When acquisition of a search permission is ordered from the document searching user, the request unit 61 generates a search permission request including the user ID of the document searching user and transmits the generated search permission request to the terminal device 10. When the shared key K, the verification key Ku', and the decryption key KDu corresponding to the search permission request from the terminal device 10 are received, the request unit 61 stores the received shared key K, the verification key Ku', and the decryption key KDu in the key storage unit 62. Note that, as a method of sharing keys with the terminal device 10, the request unit 61 can apply a method of sharing using direct communication between the above described various terminal devices or a method of sharing by end-to-end encryption between the terminal devices via a network can be applied as well as the terminal device 10.

When input of a search keyword from the document searching user is received, the search unit 70 transmits an encrypted keyword to the server 100 and receives a corresponding search result. The search unit 70 has a keyword input unit 71, a generation unit 72, and a decryption unit 73.

The keyword input unit 71 receives input of search keywords from the document searching user. The keyword input unit 71 outputs the received search keyword (hereinafter, referred to as keyword w) to the generation unit 72.

When the keyword w is input from the keyword input unit 71, the generation unit 72 acquires the shared key K and the verification key Ku' from the key storage unit 62. The generation unit 72 carries out computation shown in following Equation (3) with respect to the keyword w by using the shared key K and the verification key Ku' and generates an encryption search index Ind'.

$$Ind' = H_K(w) \oplus K'_u \quad (3)$$

In other words, the generation unit 72 generates the encryption search index Ind' of the keyword w by calculating an exclusive OR of a Keyed hash function of the keyword w and the verification key Ku'. The generation unit 72 associates the user ID of the document searching user with the generated encryption search index Ind' and transmits them to the server 100.

When a search result res' is received from the server 100, the decryption unit 73 acquires the decryption key KDu from the key storage unit 62. The decryption unit 73 acquires the document D by decrypting the acquired search result res' by using the decryption key KDu. In other words, if the decrypted document D is ans, ans can be expressed by ans=Dec(res'). The decryption unit 73 causes the decrypted document D by an unillustrated display unit to preset the document to the document searching user.

Note that the terminal device 10 of the document owner user may be configured to carry out searching. In such a case, the authentication key K' is used instead of the verification key Ku', the computation shown in following Equation (4) is carried out, and the encryption search index Ind is generated. Also, the terminal device 10 decrypts the search result res by using the master decryption key KD and acquires the document D. Note that, also in the case in which searching is carried out by the terminal device 10, the verification key Ku' for the document owner user, which is separately generated, may be used.

$$Ind = H_K(w) \oplus K' \quad (4)$$

[1-4. Configuration of Server According to Embodiment]

Figure 4:
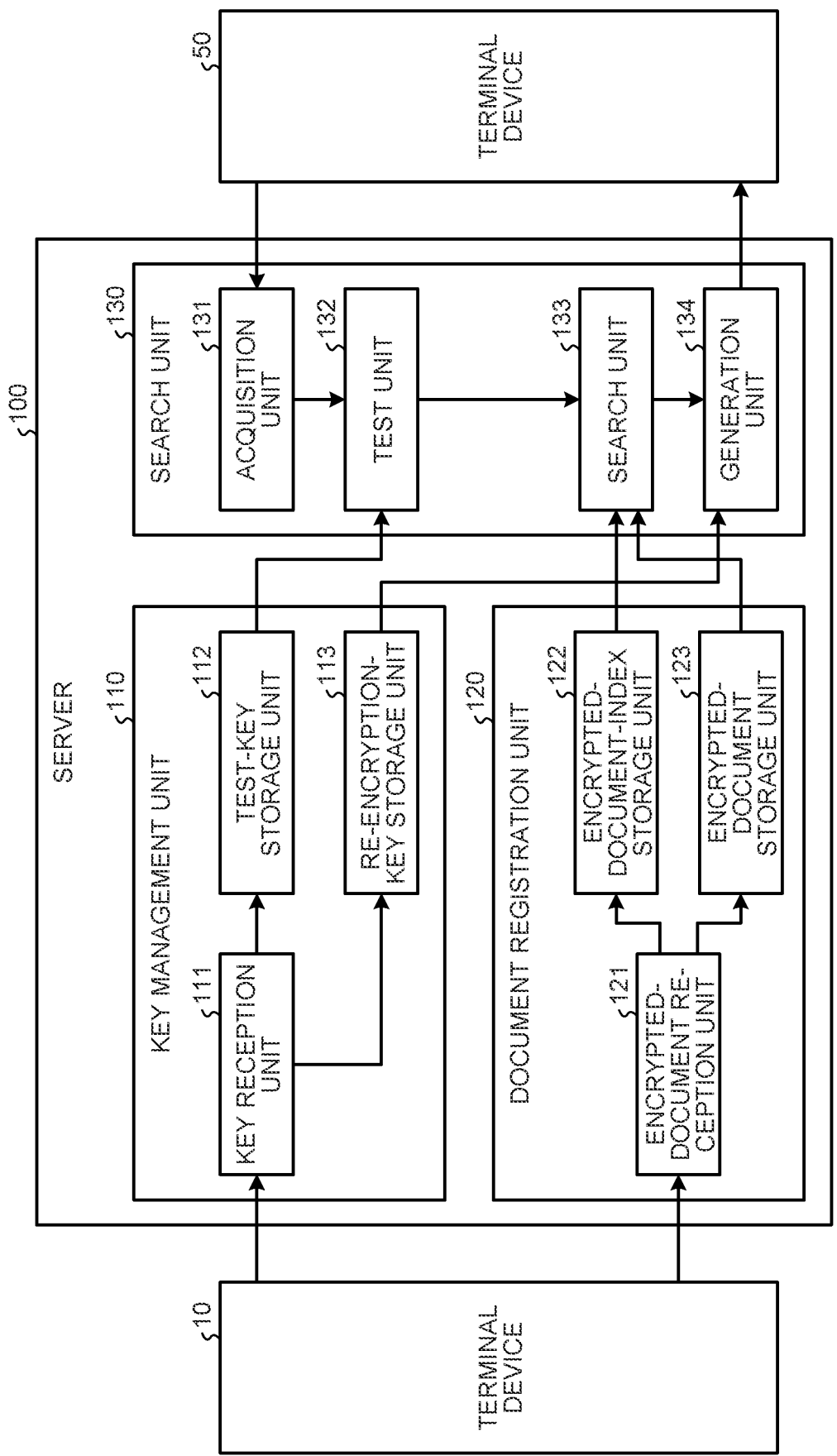
FIG. 4 is a diagram illustrating an example of a configuration of a server according to the embodiment of the present disclosure.

FIG. 4 is a diagram illustrating an example of a configuration of the server according to the embodiment of the present disclosure. As illustrated in FIG. 4, the server 100 has the key management unit 110, the document registration unit 120, and the search unit 130.

The key management unit 110 manages the test key Ku" and the re-encryption key KDu', which have been received from the document owner user and are associated with the user ID of the document searching user. The key management unit 110 has a key reception unit 111, a test-key storage unit 112, and a re-encryption-key storage unit 113. Note that, in the following description, the test-key storage unit 112 and the re-encryption-key storage unit 113 together may be also referred to as a key database.

When the test key Ku" and the re-encryption key KDu' associated with the user ID of the document searching user are received from the terminal device 10 of the document owner user, the key management unit 110 stores the test key Ku" in the test-key storage unit 112 and stores the re-encryption key KDu' in the re-encryption-key storage unit 113. In a case in which a key expiration period is set for the test key Ku" and the re-encryption key KDu', when the expiration period expires, the key management unit 110 erases the corresponding test key Ku" and the re-encryption key KDu' stored in the test-key storage unit 112 and the re-encryption-key storage unit 113.

The document registration unit 120 registers the encrypted document $Data_D$ and the encrypted-document index Ind(D), which has been received from the document owner user. The document registration unit 120 has an encrypted-document reception unit 121, an encrypted-document-index storage unit 122, and an encrypted-document storage unit 123. Note that, in the following description, the encrypted-document-index storage unit 122 and the encrypted-document storage unit 123 together may be also referred to as a document database.

The encrypted-document reception unit 121 receives the encrypted document $Data_D$ and the encrypted-document index Ind(D), which are associated with the user ID, from the terminal device 10 of the document owner user. The encrypted-document reception unit 121 associates the received encrypted-document index Ind(D) with the user ID and stores the index in the encrypted-document-index storage unit 122. Also, the encrypted-document reception unit 121 associates the received encrypted document $Data_D$ with the user ID and stores the data in the encrypted-document storage unit 123.

Figure 5:
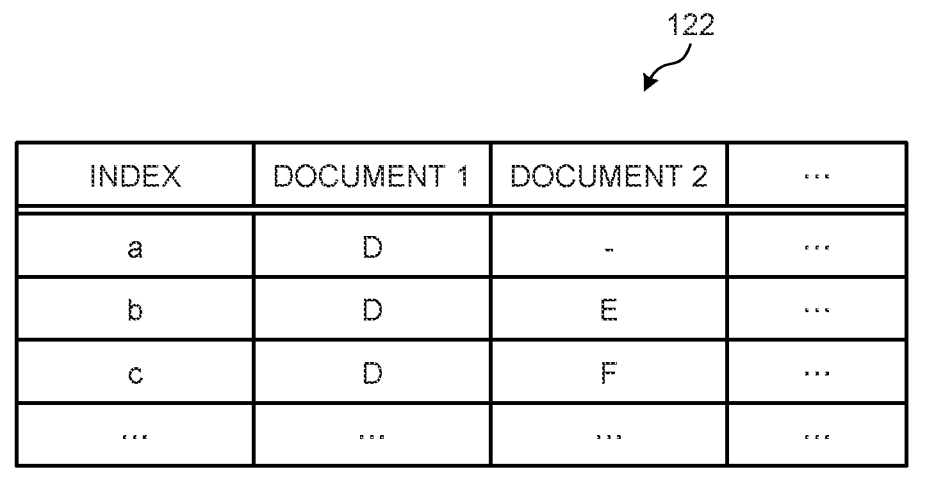

Herein, the encrypted-document-index storage unit 122 will be described by using FIG. 5. FIG. 5 is a diagram illustrating an example of the encrypted-document-index storage unit. As illustrated in FIG. 5, the encrypted-document-index storage unit 122 has items such as "INDEX", "DOCUMENT 1", and "DOCUMENT 2".

The "INDEX" represents the encrypted-document index $Ind_i$ of the keyword $w_i$ included in the encrypted-document index Ind(D). In the example of FIG. 5, encrypted-document indices $Ind_a$, $Ind_b$, $Ind_c$, and so on are included. The "DOCUMENT 1" and "DOCUMENT 2" represent the encrypted document Data associated with the encrypted-document index $Ind_i$. In the example of FIG. 5, the encrypted document $Data_D$ is associated with the encrypted-document index $Ind_a$. Also, the encrypted-document index $Ind_b$ is associated with the encrypted document $Data_D$ and encrypted document $Data_E$. Also, the encrypted-document index $Ind_c$ is associated with the encrypted document $Data_D$ and encrypted document $Data_F$.

Description goes back to that of FIG. 4. The search unit 130 carries out searching of an encrypted document based on the user ID and the encryption search index Ind or Ind' received from the terminal device 10 of the document owner user or the terminal device 50 of the document searching user. The search unit 130 has an acquisition unit 131, a test unit 132, a search unit 133, and a generation unit 134.

When the document owner user carries out searching, the acquisition unit 131 receives and acquires the user ID and the encryption search index Ind from the terminal device 10. When the document searching user carries out searching, the acquisition unit 131 receives and acquires the user ID and the encryption search index Ind' from the terminal device 50. The acquisition unit 131 outputs the acquired user ID and the encryption search index Ind or Ind' to the test unit 132.

When the user ID and the encryption search index Ind are input from the acquisition unit 131, the test unit 132 checks the document database and determines the input as a search request from the document owner user based on the user ID. When the search request from the document owner user is determined, the test unit 132 outputs the user ID and the encryption search index Ind to the search unit 133.

On the other hand, when the search request is determined as a search request which is not from the document owner user, the test unit 132 acquires the test key Ku" from the test-key storage unit 112 based on the user ID. More specifically, the test key Ku" is acquired as shown in following Equation (5), wherein the key database is KeyDB, and the user ID is u.

$$KeyDB[u]=Ku'' \tag{5}$$

The test unit 132 tests the encryption search index Ind' by using the acquired test key Ku". More specifically, the test unit 132 generates an encryption search index Ind by calculating an exclusive OR of the encryption search index Ind' and the test key Ku" as shown in following Equation (6).

$$Ind=Ind' \oplus K''_u \tag{6}$$

More specifically, if the verification key Ku' used in generation of the encryption search index Ind' is a legitimate key based on the authentication key K', the encryption search index Ind same as that of the case in which the document owner user carries out searching is generated when the exclusive OR of the test key Ku" and the encryption search index Ind' is calculated. The test unit 132 outputs the user ID and the generated encryption search index Ind to the search unit 133.

When the user ID and the encryption search index Ind are input from the test unit 132, the search unit 133 searches for the encrypted document from the document database. More specifically, the search unit 133 checks the encrypted-document-index storage unit 122 and specifies the encrypted document Data (for example, encrypted document $Data_D$.) corresponding to the encryption search index Ind. The search unit 133 checks the encrypted-document storage unit 123 and acquires the specified encrypted document Data as a search result res. The search unit 133 outputs the user ID and the search result res to the generation unit 134.

In a case in which the search request is determined by the test unit 132 to be a request received from the document owner user, when the user ID and the search result res are input from the search unit 133, the generation unit 134 transmits the search result res to the terminal device 10 of the document owner user.

On the other hand, in a case in which it is determined in the test unit 132 that the search request is not a request from the document owner user, the generation unit 134 acquires the re-encryption key KDu' from the re-encryption-key storage unit 113. The generation unit 134 subjects the search result res to proxy re-encryption by the re-encryption key KDu' to generate a search result res'. The generation unit 134 transmits the generated search result res' to the terminal device 50 of the document searching user.

[1-5. Registration and Search by Document Owner User]

Figure 6:
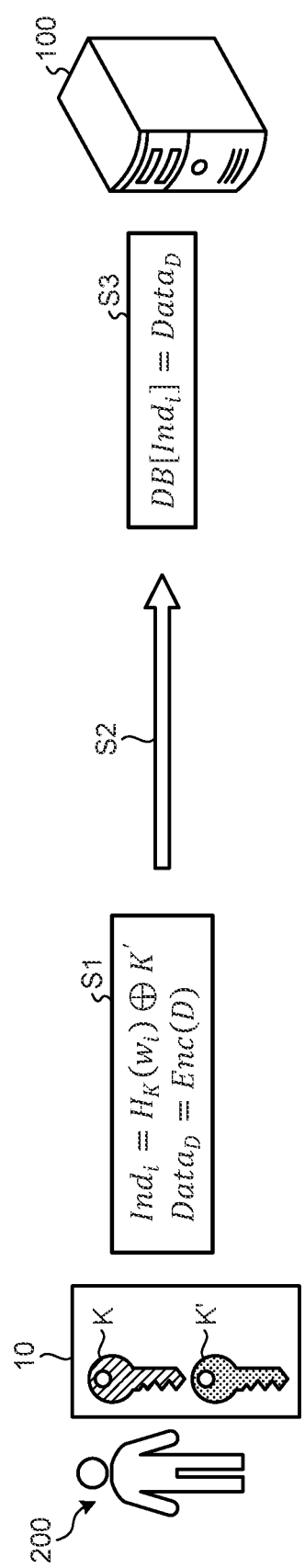
FIG. 6 is a diagram describing an example of registration of a document.

Next, registration and searching by a document owner user will be described by using FIG. 6 and FIG. 7. FIG. 6 is a diagram describing an example of registration of a document. As illustrated in FIG. 6, when a document owner user 200 inputs the document D to the terminal device 10, the terminal device 10 generates the encrypted document Data$_D$=Enc(D) by using the document encryption key KE. Also, the terminal device 10 extracts the keyword group W(D) from the document D and generates the encrypted-document index Ind(D) by above described Equation (1) by using the shared key K and the authentication key K' (step S1).

The terminal device 10 associates the user ID of the document owner user with the encrypted document Data$_D$ and the encrypted-document index Ind(D) and transmits them to the server 100 (step S2). When the user ID of the document owner user, the encrypted document Data$_D$, and the encrypted-document index Ind(D) are received, the server 100 stores the encrypted document Data$_D$ and the encrypted-document index Ind(D) in the document database. In the document database, as shown in following Equation (7), the encrypted document Data$_D$ is registered for each of the encrypted-document indices Ind$_i$ (see the encrypted-document-index storage unit 122 of FIG. 5).

$$DB[Ind_i] = Data_D \quad (7)$$

Figure 7:
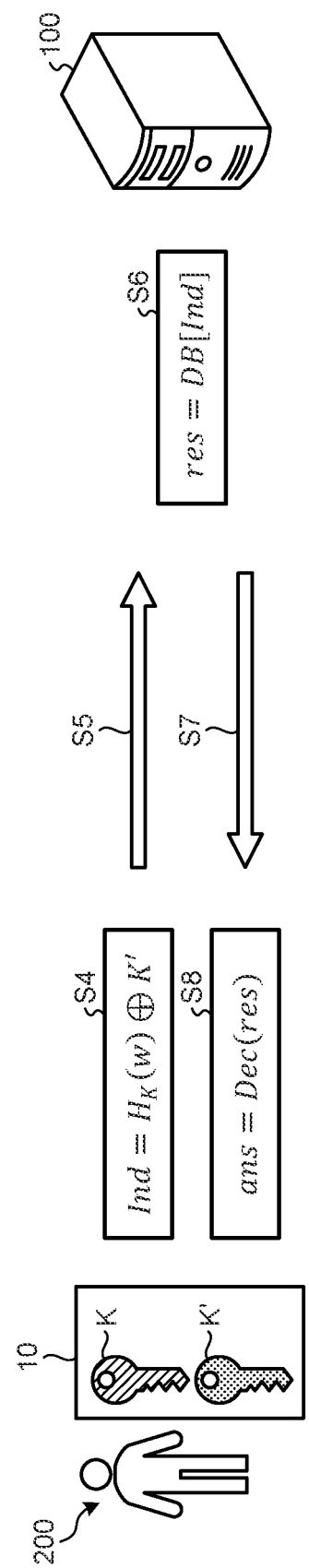
FIG. 7 is a diagram describing an example of a case in which the document owner user carries out searching.

FIG. 7 is a diagram describing an example of a case in which the document owner user carries out searching. As illustrated in FIG. 7, when the document owner user 200 inputs the keyword w to the terminal device 10, the terminal device 10 generates the encryption search index Ind by above described Equation (4) by using the shared key K and the authentication key K' (step S4). The terminal device 10 associates the user ID of the document owner user 200 with the generated encryption search index Ind and transmits them to the server 100 (step S5).

When the user ID and the encryption search index Ind are received from the terminal device 10, the server 100 checks the document database and determines that the request is a search request from the document owner user based on the user ID. The server 100 searches for the encrypted document from the document database based on the encryption search index Ind. More specifically, as shown in following Equation (8), the server 100 acquires, as the search result res, the search result of searching the document database with the encryption search index Ind (step S6). The search result res is, for example, the encrypted document Data$_D$.

$$res = DB[Ind] \quad (8)$$

The server 100 transmits the search result res to the terminal device 10 of the document owner user 200 (step S7).

When the search result res is received from the server 100, the terminal device 10 of the document owner user 200 decrypts the search result res by using the master decryption key KD to acquire the decryption result ans as shown in following Equation (9) (step S8). More specifically, the terminal device 10, for example, acquires the document D by decrypting the encrypted document Data$_D$, which is the search result res, by the master decryption key KD.

$$ans = Dec(res) \quad (9)$$

In this manner, the document owner user 200 can register the encrypted document and also can carry out keyword searching of an encrypted document at high speed by using the terminal device 10 of his/her own. In other words, the document owner user 200 can save the document in an encrypted state so that even a business operator providing the server 100 cannot see the document. Also, even in a case in which an encrypted document is searched for, the document owner user 200 can carry out keyword searching at high speed without letting the business operator providing the server 100 to know the contents of the document.

[1-6. Search by Document Searching User]

Figure 8:
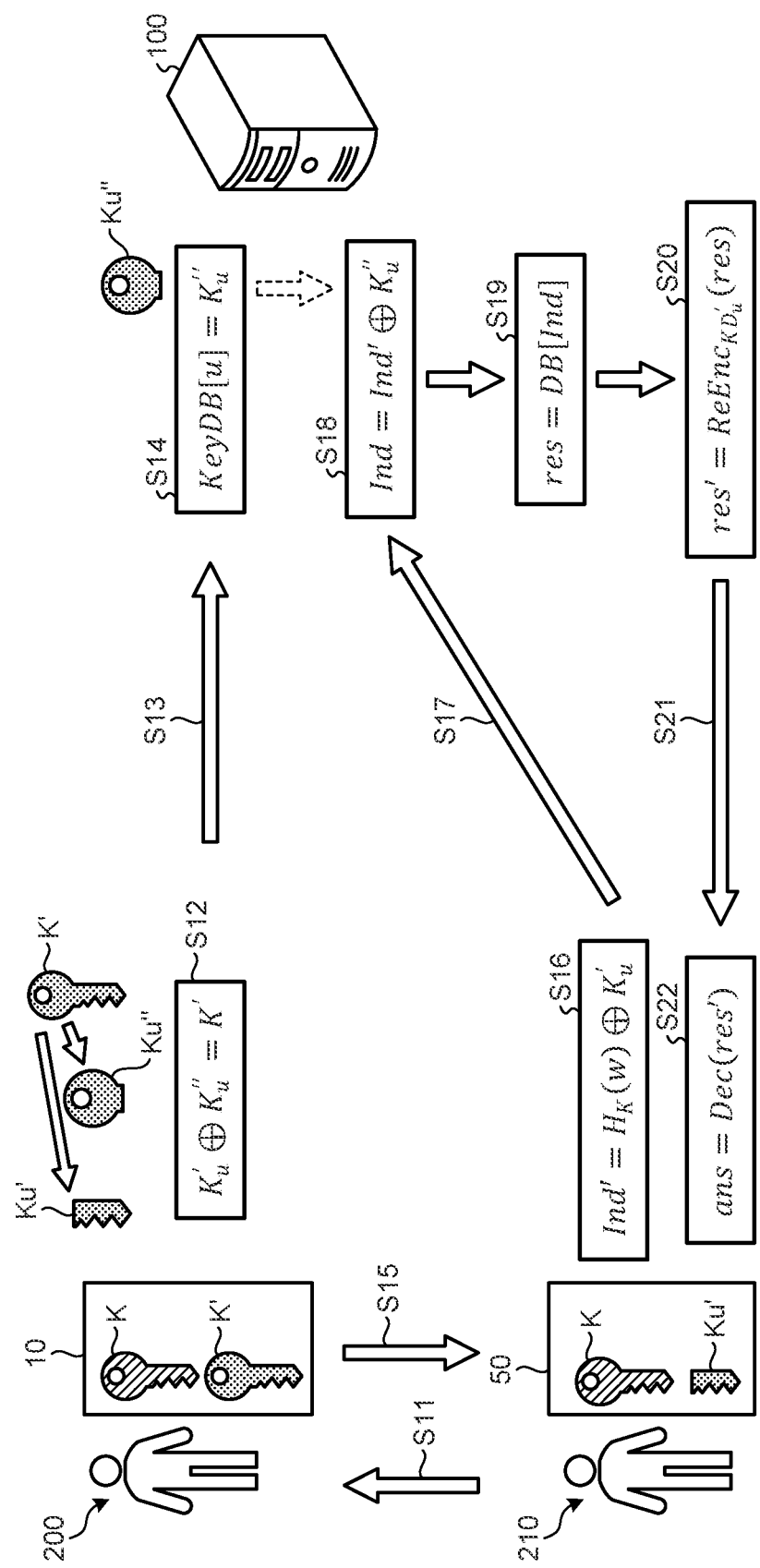
FIG. 8 is a diagram describing an example of a case in which the document searching user carries out searching.

Subsequently, searching by the document searching user will be described by using FIG. 8. FIG. 8 is a diagram describing an example of a case in which the document searching user carries out searching. As illustrated in FIG. 8, the terminal device 50 ordered by a document searching user 210 to acquire a search permission transmits a search permission request to the terminal device 10 of the document owner user 200 (step S11).

When the search permission request is received from the terminal device 50, the terminal device 10 of the document owner user 200 determines whether to give a search permission or not and, if it is determined to give a search permission, the terminal device 10 divides the authentication key K' into a verification key Ku' and a test key Ku" (step S12). Also, the terminal device 10 divides the master decryption key KD into the decryption key KDu and the re-encryption key KDu'.

The terminal device 10 transmits the user ID of the document searching user 210, the test key Ku", and the re-encryption key KDu' to the server 100 (step S13).

When the test key Ku" and the re-encryption key KDu' associated with the user ID of the document searching user 210 are received from the terminal device 10, the server 100 registers the received key in the key database (step S14). Also, the terminal device 10 transmits the shared key K, the verification key Ku', and the decryption key KDu to the terminal device 50 (step S15).

When the shared key K, the verification key Ku', and the decryption key KDu corresponding to the search permission request from the terminal device 10 are received from the terminal device 10, the terminal device 50 stores the received key in the key storage unit 62. When the document searching user 210 inputs the keyword w to the terminal device 50, the terminal device 50 generates the encryption search index Ind' by above described Equation (3) by using the shared key K and the verification key Ku' (step S16). The terminal device 50 associates the user ID of the document searching user 210 with the generated encryption search index Ind' and transmits them to the server 100 (step S17).

When the user ID and the encryption search index Ind' of the document searching user 210 are received from the terminal device 50, the server 100 checks the document database and determines that the request is not a search request from the document owner user 200 based on the user ID. When it is determined not to be a search request from the document owner user 200, as shown in above described Equation (5), the server 100 acquires the test key Ku" from the key database based on the user ID.

The server 100 generates an encryption search index Ind by calculating an exclusive OR of the encryption search index Ind' and the test key Ku" as shown in following Equation (6) (step S18). The server 100 searches for the encrypted document from the document database based on the encryption search index Ind. More specifically, as shown in above Equation (8), the server 100 acquires, as the search result res, the search result of searching the document database with the encryption search index Ind (step S19). The search result res is, for example, the encrypted document $Data_D$.

As shown in following Equation (10), the server 100 subjects the search result res to proxy re-encryption with the re-encryption key KDu' to generate the search result res' (step S20).

$$res'=ReEnc_{KDu'}(res) \qquad (10)$$

The generation unit 134 transmits the generated search result res' to the terminal device 50 (step S21).

When the search result res' is received from the server 100, the terminal device 50 acquires ans (for example, document D), which is a decryption result, by decrypting the search result res' by using the decryption key KDu (step S22).

In this manner, the document searching user 210 can carry out keyword searching of an encrypted document at high speed by using the terminal device 50 of his/her own. Therefore, the document searching user 210 who is permitted by the document owner user 200 owning an encrypted document can also carry out keyword searching without decrypting the encrypted document.

[1-7. Procedure of Information Processing According to Embodiment]

Figure 9:
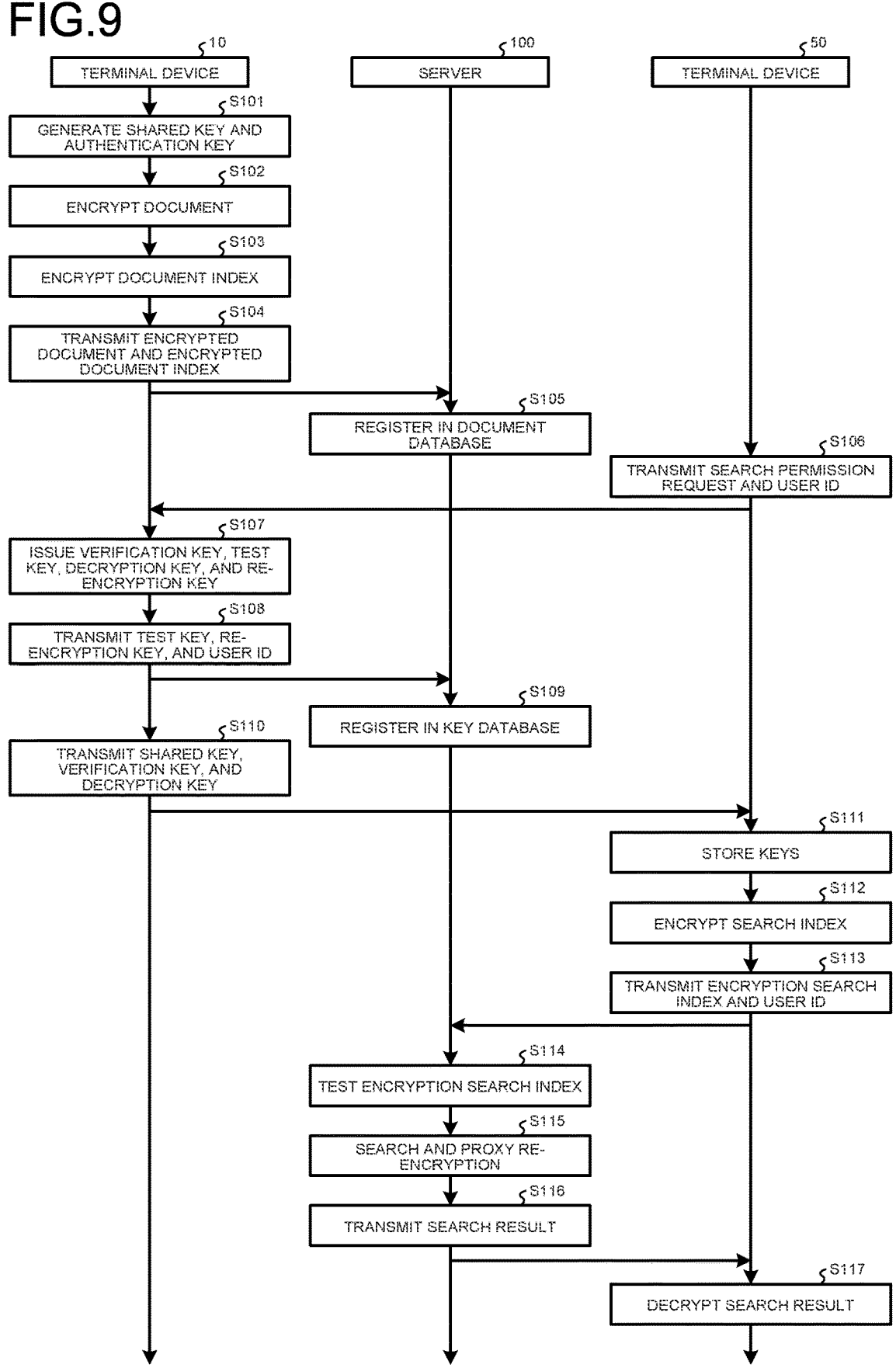
FIG. 9 is a sequence diagram illustrating an example of a document searching processes.

Next, by using FIG. 9, a series of document searching processes from registration of the document D by the document owner user to searching by the document searching user will be described by using a sequence diagram. FIG. 9 is a sequence diagram illustrating an example of the document searching processes.

As illustrated in FIG. 9, the key management unit 20 of the terminal device 10 generates the shared key K and the authentication key K' (step S101). Also, the key management unit 20 generates the document encryption key KE and the master decryption key KD.

The document registration unit 30 receives input of the document D from the document owner user. The document registration unit 30 encrypts the document D to generate the encrypted document $Data_D$ by using the document encryption key KE (step S102). Also, the document registration unit 30 generates the encrypted-document index Ind(D) of the keyword group W(D) by extracting the keyword group W(D) from the document D and using the shared key K and the authentication key K' (step S103). The document registration unit 30 associates the user ID of the document owner user with the encrypted document $Data_D$ and the encrypted-document index Ind(D) and transmits them to the server 100 (step S104).

The document registration unit 120 of the server 100 registers the encrypted document $Data_D$ and the encrypted-document index Ind(D), which have been received from the document owner user, in the document database (step S105).

When acquisition of a search permission is ordered from the document searching user, the key management unit 60 of the terminal device 50 generates a search permission request including the user ID of the document searching user and transmits the request to the terminal device 10 (step S106).

When the search permission request is received from the terminal device 50, if it is determined based on the user ID to give a search permission, the permission unit 40 of the terminal device 10 divides the authentication key K' into the verification key Ku' and the test key Ku". Also, the permission unit 40 divides the master decryption key KD into the decryption key KDu and the re-encryption key KDu'. In other words, the permission unit 40 issues the verification key Ku', the test key Ku", the decryption key KDu, and the re-encryption key KDu' (step S107).

The permission unit 40 transmits the test key Ku", the re-encryption key KDu', and the user ID of the document searching user to the server 100 (step S108).

The key management unit 110 of the server 100 associates the received test key Ku" and the re-encryption key KDu' with the user ID of the document searching user and registers them in the key database (step S109).

The permission unit 40 of the terminal device 10 transmits the shared key K, the verification key Ku', and the decryption key KDu to the terminal device 50 (step S110).

The key management unit 60 of the terminal device 50 stores the received shared key K, the verification key Ku', and the decryption key KDu in the key storage unit 62 (step S111). When input of the keyword w is received from the document searching user, the search unit 70 generates the encryption search index Ind' corresponding to the keyword w by using the shared key K and the verification key Ku' (step S112). The search unit 70 transmits the generated encryption search index Ind' and the user ID of the document searching user to the server 100 (step S113).

When the user ID of the document searching user and the encryption search index Ind' are received from the terminal device 50, the search unit 130 of the server 100 checks the document database and determines that the request is not a search request from the document owner user. The search unit 130 tests the encryption search index Ind' by using the test key Ku" (step S114). When the encryption search index Ind is obtained as a result of the test, the search unit 130 searches for and acquires, as the search result res, the encrypted document $Data_D$ from the document database by using the encryption search index Ind. The search unit 130 subjects the search result res to proxy re-encryption by the re-encryption key KDu' to generate the search result res' (step S115). The search unit 130 transmits the generated search result res' to the terminal device 50 (step S116).

When the search result res' is received from the server 100, the search unit 70 of the terminal device 50 acquires the decryption key KDu from the key storage unit 62. The search unit 70 acquires the document D by decrypting the search result res' by using the decryption key KDu (step S117). In this manner, the document owner user can register the encrypted document in the server 100, and the document searching user can carry out keyword searching of the encrypted document, which is registered in the server 100, at high speed.

(2. Modification Example of Embodiment)

The processes according to the above described embodiment may be carried out in various different forms other than the above described embodiment.

In the above described embodiment, searching is carried out based on keywords connected to documents (encrypted-document index). However, the targets of application are not limited to documents since match/mismatch can be determined while the keywords are kept secret. For example, information such as objects of photographs, photographing locations, and photographing time and data may be connected to image data as keywords. In such a case, a search user with a permission can safely search for and share image data. Similarly, searching and sharing of music data can be safely carried out by using words, which are included in sound data, as keywords. Furthermore, by connecting user IDs to location information, users in a particular range can be safely searched for.

Other than that, the processing procedures, specific names, and information including various data or parameters illustrated in above described document or drawings can be arbitrarily changed unless otherwise specifically stated. For example, the various information illustrated in the drawings is not limited to the information illustrated in the drawings.

Constituent elements of each device illustrated in drawings are functional ideas and are not necessarily physically required to be formed like the illustration in the drawings. In other words, specific forms of dispersion/integration of devices are not limited to those illustrated in the drawings, but all or part thereof can be functionally or physically dispersed/integrated to be formed in an arbitrary unit depending on various load, usage situation, etc. For example, the terminal device 10 of the document owner user may be configured to integrate the functions of the terminal device 50 of the document searching user.

Also, above described embodiments and modification examples can be appropriately combined within the range in which processing contents do not conflict with each other.

(3. Hardware Configuration)

Figure 10:
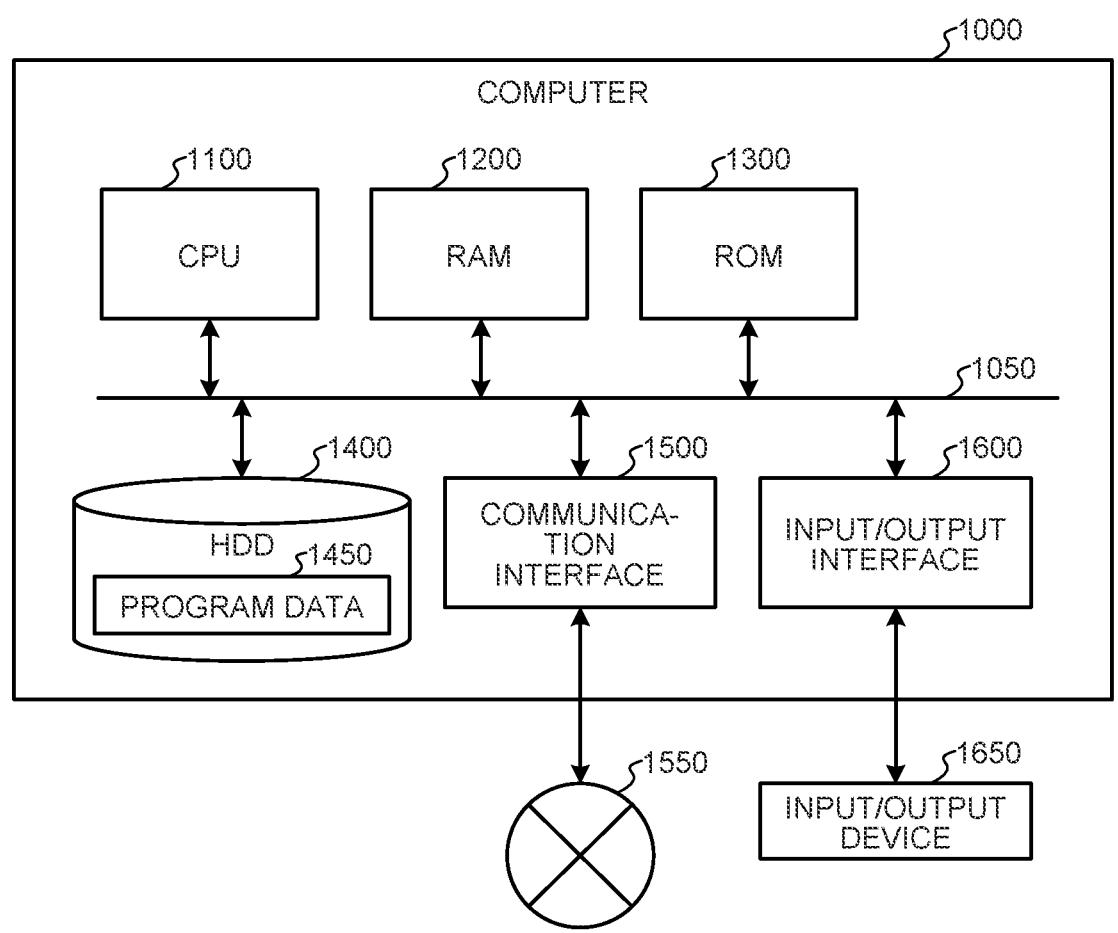
FIG. 10 is a hardware configuration diagram illustrating an example of a computer which realizes functions of the information processing device.

Information equipment such as the terminal devices 10 and 50 and the server 100 according to the above described embodiment are realized, for example, by a computer 1000 having a configuration as illustrated in FIG. 10. Hereinafter, the server 100 which is an information processing device according to the embodiment will be taken as an example for description. FIG. 10 is a hardware configuration diagram illustrating an example of a computer which realizes the functions of the information processing device. The computer 1000 has a CPU 1100, a RAM 1200, a read only memory (ROM) 1300, a hard disk drive (HDD) 1400, a communication interface 1500, and an input/output interface 1600. Each part of the computer 1000 is connected by a bus 1050.

The CPU 1100 operates based on programs stored in the ROM 1300 or the HDD 1400 and controls each part. For example, the CPU 1100 deploys the programs, which are stored in the ROM 1300 or the HDD 1400, in the RAM 1200 and executes processing corresponding to the various programs.

The ROM 1300 stores, for example, a boot program such as Basic Input Output System (BIOS), which is executed by the CPU 1100 upon startup of the computer 1000, and a program dependent on hardware of the computer 1000.

The HDD 1400 is a computer-readable recording medium which non-temporarily records, for example, programs executed by the CPU 1100 and data used by the programs. Specifically, the HDD 1400 is a recording medium which records the information processing program according to the present disclosure serving as an example of program data 1450.

The communication interface 1500 is an interface for connecting the computer 1000 to an external network 1550 (for example, the Internet). For example, the CPU 1100 receives data from other equipment and transmits the data generated by the CPU 1100 to other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. Also, the CPU 1100 transmits data to an output device such as a display, a speaker, or a printer via the input/output interface 1600. Also, the input/output interface 1600 may function as a media interface, which reads a program or the like recorded in a predetermined recording medium (media). The media are, for example, optical recording media such as digital versatile discs (DVDs) and phase change rewritable disks (PDs), magnetooptical recording media such as magneto-optical disks (MOs), tape media, magnetic recording media, or semiconductor memories.

For example, if the computer 1000 functions as the server 100 according to the embodiment, the CPU 1100 of the computer 1000 realizes functions of the search unit 130, etc. by executing the information processing program loaded on the RAM 1200. Also, the HDD 1400 stores the information processing program according to the present disclosure and data of the encrypted-document-index storage unit 122, the encrypted-document storage unit 123, etc. The CPU 1100 reads the program data 1450 from the HDD 1400 to execute the data, but may acquire these programs from other devices via the external network 1550 as another example.

(4. Effects)

The server 100 has the acquisition unit 131, the test unit 132, and the generation unit (the search unit 133, the generation unit 134). The acquisition unit 131 acquires, from a second terminal device (terminal device 50) of a second user, the encryption search index, which is the search keyword encrypted by searchable encryption using the shared key and the verification key acquired from a first terminal device (terminal device 10) of a first user who owns a document, and an identifier of the second user who searches for the document. The test unit 132 acquires a test key corresponding to the second user based on the acquired identifier of the second user from a database in which an encrypted-document index generated by the first terminal device and encrypting a keyword included in the document by searchable encryption, an encrypted document of the document encrypted and associated with the encrypted-document index, and the test key and the re-encryption key corresponding to the second user are registered, and the test unit 132 acquires the test key corresponding to the second user based on the acquired identifier of the second user and tests the encryption search index by using the test key. The generation unit acquires, from the database, the re-encryption key corresponding to the second user based on the acquired identifier of the second user, searches for the encrypted document from the database by using the tested encryption search index, and encrypts the searched encrypted document by the re-encryption key to generate a search result. As a result, the encrypted document can be subjected to high-speed keyword searching.

The document is encrypted by an encryption method that enables proxy re-encryption, and the encrypted document is encrypted by using the re-encryption key by the encryption method that enables proxy re-encryption. As a result, the document searching user can decrypt the document by using the decryption key acquired from the document owner user.

The test key and the verification key are generated based on the authentication key owned by the first user. As a result, the encryption search index using the verification key can be tested by the test key.

The re-encryption key is generated, from a decryption key owned by the first user, together with a decryption key for the second user for decrypting the search result by the second terminal device. As a result, the search result which has undergone proxy re-encryption can be decrypted by the second user.

The searchable encryption is encryption based on an exclusive OR of a Keyed hash function and the authentication key owned by the first user, the verification key, or the test key. As a result, searching can be carried out at high speed in constant time regardless of the amount of the documents registered in the database.

The acquisition unit 131 acquires, from the first terminal device, the encryption search index that is the search keyword encrypted by the searchable encryption by using the shared key and the authentication key owned by the first user, and the generation unit searches for an encrypted document from the database by using the encryption search index acquired from the first terminal device and generates the searched encrypted document as a search result. As a result, the document owner user can search for the encrypted document by using the authentication key of his/her own.

The terminal device 50 has an acquisition unit (key management unit 60), a generation unit (keyword input unit 71, generation unit 72), and the decryption unit 73. The acquisition unit requests a search permission of a document to the first terminal device (terminal device 10) of the first user who owns the document and acquires, from the first terminal device, a shared key and a verification key, which are used in encryption of a search keyword, and a decryption key for decrypting the search result received from the information processing device. When input of the search keyword is received from the second user, the generation unit generates an encryption search index by using the shared key and the verification key and transmits the encryption search index to the information processing device (server 100) together with the identifier of the second user. From a database in which the encrypted-document index including a keyword included in the document encrypted by searchable encryption, the encrypted document which is an encrypted document associated with the encrypted-document index, and the test key and the re-encryption key corresponding to the second user are registered, the decryption unit 73 acquires the test key and the re-encryption key corresponding to the second user based on the identifier of the second user, and the decryption unit 73 tests the encryption search index by using the test key, searches for the encrypted document from the database by using the tested encryption search index, receives a search result, which is the searched encrypted document encrypted by the re-encryption key, from the information processing device, and decrypts the received search result by using the decryption key. As a result, the encrypted document can be subjected to high-speed keyword searching.

The effects described in the present description are merely examples and are not limitative, and other effects may be included.

The present technique can also employ following configurations.

(1)

An information processing device comprising:

an acquisition unit that acquires, from a second terminal device of a second user, an encryption search index and an identifier of the second user who searches for a document, the encryption search index of a search keyword being encrypted by searchable encryption using a shared key and a verification key acquired from a first terminal device of a first user who owns the document;

a test unit that acquires the encrypted-document index generated in the first terminal device and including the keyword included in the document and encrypted by the searchable encryption, acquires an encrypted document of the document encrypted and associated with the encrypted-document index, acquires a test key corresponding to the second user based on the acquired identifier of the second user from a database registering the test key and a re-encryption key corresponding to the second user, and tests the encryption search index by using the test key; and a generation unit that acquires the re-encryption key corresponding to the second user from the database based on the acquired identifier of the second user, searches for the encrypted document from the database by using the tested encryption search index, and encrypts the searched encrypted document by the re-encryption key to generate a search result.

(2)

The information processing device according to (1), wherein the document is encrypted by an encryption method that enables proxy re-encryption, and the encrypted document is encrypted by using the re-encryption key by the encryption method that enables proxy re-encryption.

(3)

The information processing device according to (1) or (2), wherein the test key and the verification key are generated based on an authentication key owned by the first user.

(4)

The information processing device according to any one of (1) to (3), wherein the re-encryption key is generated, from a decryption key owned by the first user, together with a decryption key for the second user for decrypting the search result by the second terminal device.

(5)

The information processing device according to any one of (1) to (4), wherein the searchable encryption is encryption based on an exclusive OR of a Keyed hash function and the authentication key owned by the first user, the verification key, or the test key.

(6)

The information processing device according to any one of (1) to (5), wherein the acquisition unit acquires, from the first terminal device, the encryption search index that is the search keyword encrypted by the searchable encryption by using the shared key and the authentication key owned by the first user, and the generation unit searches for an encrypted document from the database by using the encryption search index acquired from the first terminal device and generates the searched encrypted document as a search result.

(7)

A terminal device comprising:

an acquisition unit that requests a search permission of a document to a first terminal device of a first user who owns the document and acquires, from the first terminal device, a shared key and a verification key used in encryption of a search keyword and a decryption key for decrypting a search result received from an information processing device;

a generation unit, when input of the search keyword is received from a second user, that generates an encryption search index by using the shared key and the verification key and transmits the encryption search index together with an identifier of the second user to the information processing device;

a decryption unit that acquires the test key and a re-encryption key corresponding to the second user based on the identifier of the second user from a database registering the encrypted-document index of the keyword included in the document encrypted by searchable encryption, an encrypted document associated with the encrypted-document index, and the test key and the re-encryption key corresponding to the second user, tests the encryption search index by using the test key, searches for the encrypted document from the database by using the tested encryption search index, receives a search result including the searched encrypted document encrypted by the re-encryption key from the information processing device, and decrypts the received search result by using the decryption key.

(8) A search method that causes a computer to execute a process of:

acquiring, from a second terminal device of a second user, an encryption search index and an identifier of the second user who searches for a document, the encryption search index of a search keyword being encrypted by searchable encryption using a shared key and a verification key acquired from a first terminal device of a first user who owns the document;

acquiring the encrypted-document index generated in the first terminal device and including the keyword included in the document and encrypted by the searchable encryption, acquiring an encrypted document of the document encrypted and associated with the encrypted-document index, acquiring a test key corresponding to the second user based on the acquired identifier of the second user from a database registering the test key and a re-encryption key corresponding to the second user, and testing the encryption search index by using the test key; and acquiring the re-encryption key corresponding to the second user from the database based on the acquired identifier of the second user, searching for the encrypted document from the database by using the tested encryption search index, and encrypting the searched encrypted document by the re-encryption key to generate a search result.

(9) A search method that causes a computer to execute a process of:

requesting a search permission of a document to a first terminal device of a first user who owns the document and acquiring, from the first terminal device, a shared key and a verification key used in encryption of a search keyword and a decryption key for decrypting a search result received from an information processing device;

when input of the search keyword is received from the second user, generating an encryption search index by using the shared key and the verification key and transmitting the encryption search index together with an identifier of the second user to the information processing device;

acquiring the test key and a re-encryption key corresponding to the second user based on the identifier of the second user from a database registering the encrypted-document index of the keyword included in the document encrypted by searchable encryption, an encrypted document associated with the encrypted-document index, and the test key and the re-encryption key corresponding to the second user, testing the encryption search index by using the test key, searching for the encrypted document from the database by using the tested encryption search index, receiving a search result including the searched encrypted document encrypted by the re-encryption key from the information processing device, and decrypting the received search result by using the decryption key.

REFERENCE SIGNS LIST

1 SEARCH SYSTEM
10, 50 TERMINAL DEVICE
20 KEY MANAGEMENT UNIT
30 DOCUMENT REGISTRATION UNIT
40 PERMISSION UNIT
60 KEY MANAGEMENT UNIT
70 SEARCH UNIT
71 KEYWORD INPUT UNIT
72 GENERATION UNIT
73 DECRYPTION UNIT
100 SERVER
110 KEY MANAGEMENT UNIT
111 KEY RECEPTION UNIT
112 TEST-KEY STORAGE UNIT
113 RE-ENCRYPTION-KEY STORAGE UNIT
120 DOCUMENT REGISTRATION UNIT
121 ENCRYPTED-DOCUMENT RECEPTION UNIT
122 ENCRYPTED-DOCUMENT-INDEX STORAGE UNIT
123 ENCRYPTED-DOCUMENT STORAGE UNIT
130 SEARCH UNIT
131 ACQUISITION UNIT
132 TEST UNIT
133 SEARCH UNIT
134 GENERATION UNIT
K SHARED KEY
K' AUTHENTICATION KEY
Ku' VERIFICATION KEY
Ku'' TEST KEY
KD MASTER DECRYPTION KEY
KDu DECRYPTION KEY
KDu' RE-ENCRYPTION KEY
KE DOCUMENT ENCRYPTION KEY

The invention claimed is:

1. An information processing device, comprising:
an acquisition unit configured to acquire, from a second terminal device of a second user, an encryption search index and an identifier of the second user who searches for a document, wherein the encryption search index of a search keyword is encrypted by searchable encryption using a shared key and a verification key acquired from a first terminal device of a first user who owns the document;
a test unit configured to:
acquire an encrypted-document index generated in the first terminal device, wherein the encrypted-document index includes the search keyword included in the document and encrypted by the searchable encryption;
acquire an encrypted document of the document encrypted and associated with the encrypted-document index;
acquire a test key corresponding to the second user based on the acquired identifier of the second user from a database registering the test key and a re-encryption key corresponding to the second user, and
test the encryption search index by using the test key; and
a generation unit configured to:
acquire the re-encryption key corresponding to the second user from the database based on the acquired identifier of the second user;
search for the encrypted document from the database by using the tested encryption search index; and
encrypt the searched encrypted document by the re-encryption key to generate a search result.

2. The information processing device according to claim 1, wherein the document is encrypted by an encryption method that enables proxy re-encryption, and the encrypted document is encrypted by using the re-encryption key by the encryption method that enables the proxy re-encryption.

3. The information processing device according to claim 1, wherein the test key and the verification key are generated based on an authentication key owned by the first user.

4. The information processing device according to claim 1, wherein the re-encryption key is generated, from a decryption key owned by the first user, together with a decryption key for the second user to decrypt the search result by the second terminal device.

5. The information processing device according to claim 1, wherein the searchable encryption is encryption based on an exclusive OR of a Keyed hash function and the authentication key owned by the first user, the verification key, or the test key.

6. The information processing device according to claim 1, wherein
the acquisition unit is further configured to acquire, from the first terminal device, the encryption search index that is the search keyword encrypted by the searchable encryption by using the shared key and the authentication key owned by the first user, and
the generation unit is further configured to:
search for an encrypted document from the database by using the encryption search index acquired from the first terminal device; and
generate the searched encrypted document as a search result.

7. A terminal device, comprising:
an acquisition unit configured to:
acquire, from a first terminal device of a first user who owns a document, a shared key and a verification key used in encryption of a search keyword and a decryption key to decrypt a search result received from an information processing device;
a generation unit configured to:
generate, when input of the search keyword is received from a second user, an encryption search index by using the shared key and the verification key, and
transmit the encryption search index together with an identifier of the second user to the information processing device;
a decryption unit configured to:
acquire the test key and a re-encryption key corresponding to the second user based on the identifier of the second user from a database registering the encrypted-document index of the search keyword included in the document encrypted by searchable encryption, an encrypted document associated with the encrypted-document index, and the test key and the re-encryption key corresponding to the second user;
test the encryption search index by using the test key;
search for the encrypted document from the database by using the tested encryption search index;
receive a search result that includes the searched encrypted document encrypted by the re-encryption key from the information processing device, and
decrypt the received search result by using the decryption key.

8. A search method, comprising:
acquiring, from a second terminal device of a second user, an encryption search index and an identifier of the second user who searches for a document, wherein the encryption search index of a search keyword is encrypted by searchable encryption using a shared key and a verification key acquired from a first terminal device of a first user who owns the document;
acquiring an encrypted-document index generated in the first terminal device, wherein the encrypted-document index includes the search keyword included in the document and encrypted by the searchable encryption;
acquiring an encrypted document of the document encrypted and associated with the encrypted-document index;
acquiring a test key corresponding to the second user based on the acquired identifier of the second user from a database registering the test key and a re-encryption key corresponding to the second user
testing the encryption search index by using the test key;
acquiring the re-encryption key corresponding to the second user from the database based on the acquired identifier of the second user;
searching for the encrypted document from the database by using the tested encryption search index and
encrypting the searched encrypted document by the re-encryption key to generate a search result.

9. A search method, comprising:
acquiring, from a first terminal device of a first user who owns a document, a shared key and a verification key used in encryption of a search keyword and a decryption key for decrypting a search result received from an information processing device;
when input of the search keyword is received from the second user, generating an encryption search index by using the shared key and the verification key and transmitting the encryption search index together with an identifier of the second user to the information processing device;
acquiring the test key and a re-encryption key corresponding to the second user based on the identifier of the second user from a database registering the encrypted-document index of the search keyword included in the document encrypted by searchable encryption, an encrypted document associated with the encrypted-document index, and the test key and the re-encryption key corresponding to the second user;
testing the encryption search index by using the test key;
searching for the encrypted document from the database by using the tested encryption search index;
receiving a search result including the searched encrypted document encrypted by the re-encryption key from the information processing device and
decrypting the received search result by using the decryption key.

* * * * *